United States Patent [19]

Wu

[11] Patent Number: 5,341,097

[45] Date of Patent: Aug. 23, 1994

[54] ASYMMETRICAL MAGNETIC POSITION DETECTOR

[75] Inventor: Mien T. Wu, Madison, Wis.

[73] Assignee: Honeywell Inc., Minneapolis, Minn.

[21] Appl. No.: 952,449

[22] Filed: Sep. 29, 1992

[51] Int. Cl.⁵ .............................. G01B 7/34; G01B 7/14
[52] U.S. Cl. .................... 324/207.2; 324/235; 324/207.12
[58] Field of Search ........... 324/207.2, 207.12, 207.21, 324/207.25, 207.24, 225, 251, 252, 173, 174

[56] References Cited

U.S. PATENT DOCUMENTS

| | | | |
|---|---|---|---|
| 4,086,533 | 4/1978 | Ricouard et al. | 324/207.2 |
| 4,481,469 | 11/1984 | Hauler et al. | |
| 4,712,064 | 12/1987 | Eckardt et al. | |
| 4,725,776 | 2/1988 | Onodera et al. | |
| 4,745,363 | 5/1988 | Carr et al. | 324/207.2 |
| 4,783,627 | 11/1988 | Pagel et al. | |
| 4,853,632 | 8/1989 | Nagano et al. | |
| 4,857,842 | 8/1989 | Sturman et al. | 324/225 |
| 4,859,941 | 8/1989 | Higgs et al. | 324/207.2 |
| 4,875,008 | 10/1989 | Lorenzen | 324/207.21 |
| 4,943,772 | 7/1990 | Maupu et al. | 324/207.2 |
| 4,970,463 | 11/1990 | Wolf et al. | 324/207.2 |
| 4,990,850 | 2/1991 | Votruba | 324/251 |
| 4,992,731 | 2/1991 | Lorenzen | 324/207.2 |
| 5,128,613 | 7/1992 | Takahashi | 324/235 |

Primary Examiner—Kenneth A. Wieder
Assistant Examiner—Jay M. Patidar
Attorney, Agent, or Firm—William D. Lanyi

[57] ABSTRACT

A gear tooth sensor is provided which incorporates a magnet and two magnetically sensitive devices, such as Hall effect elements. The two magnetically sensitive devices are disposed in a common plane with each other with one of the devices being located at a position closer to the magnet than the other device. The common plane in which both magnetically sensitive devices are disposed is spaced apart from a central axis of the magnet by a predetermined distance. A divider is provided for determining a ratio of the magnetic field strengths that are imposed perpendicularly on the first and second magnetically sensitive devices. The ratio is used to distinguish between teeth and slots proximate the sensor wherein the common plane of the magnetically sensitive devices is generally perpendicular to the path along which the teeth and slots pass.

13 Claims, 10 Drawing Sheets

TARGET POSITION

←—TO FIG.9c—→

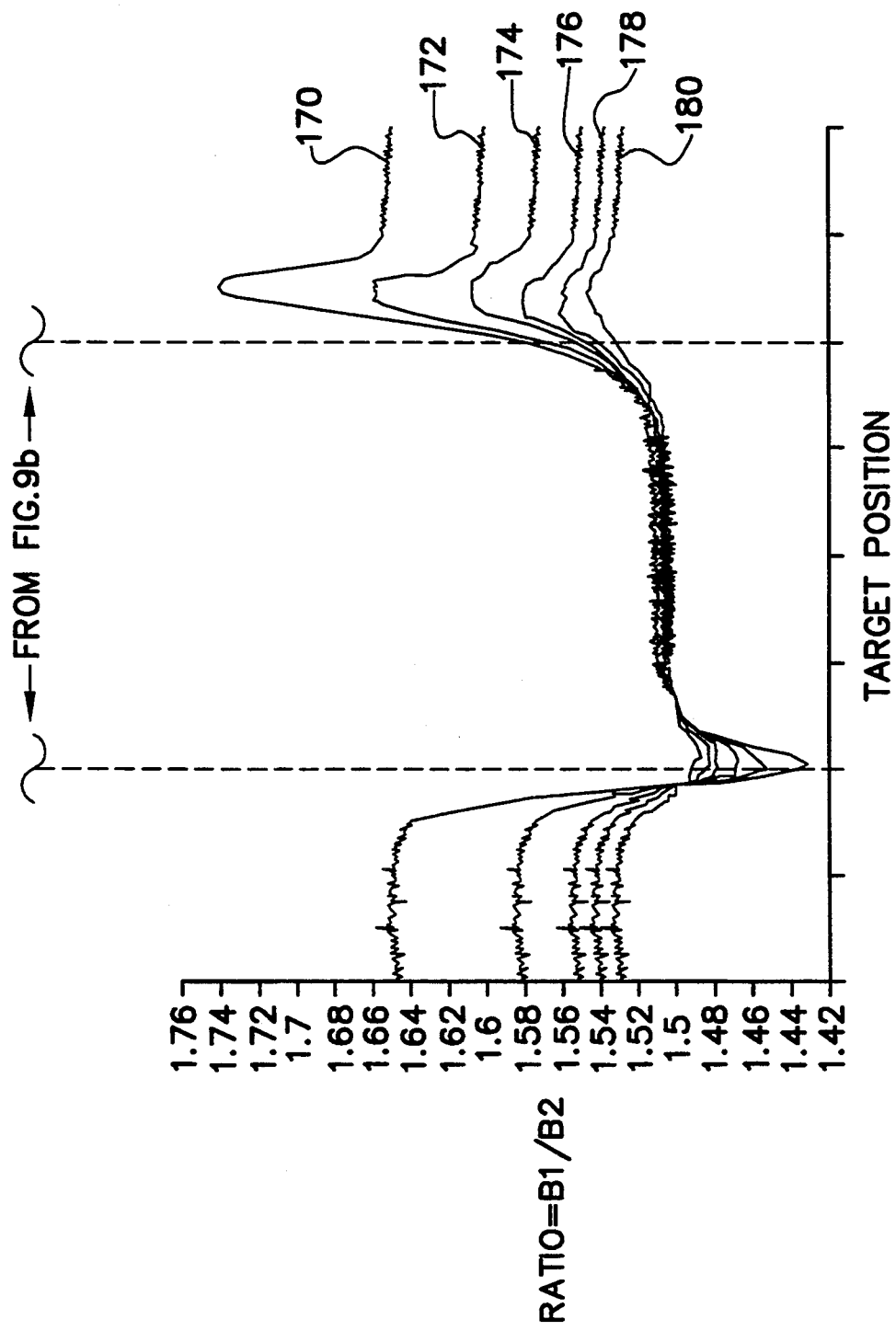

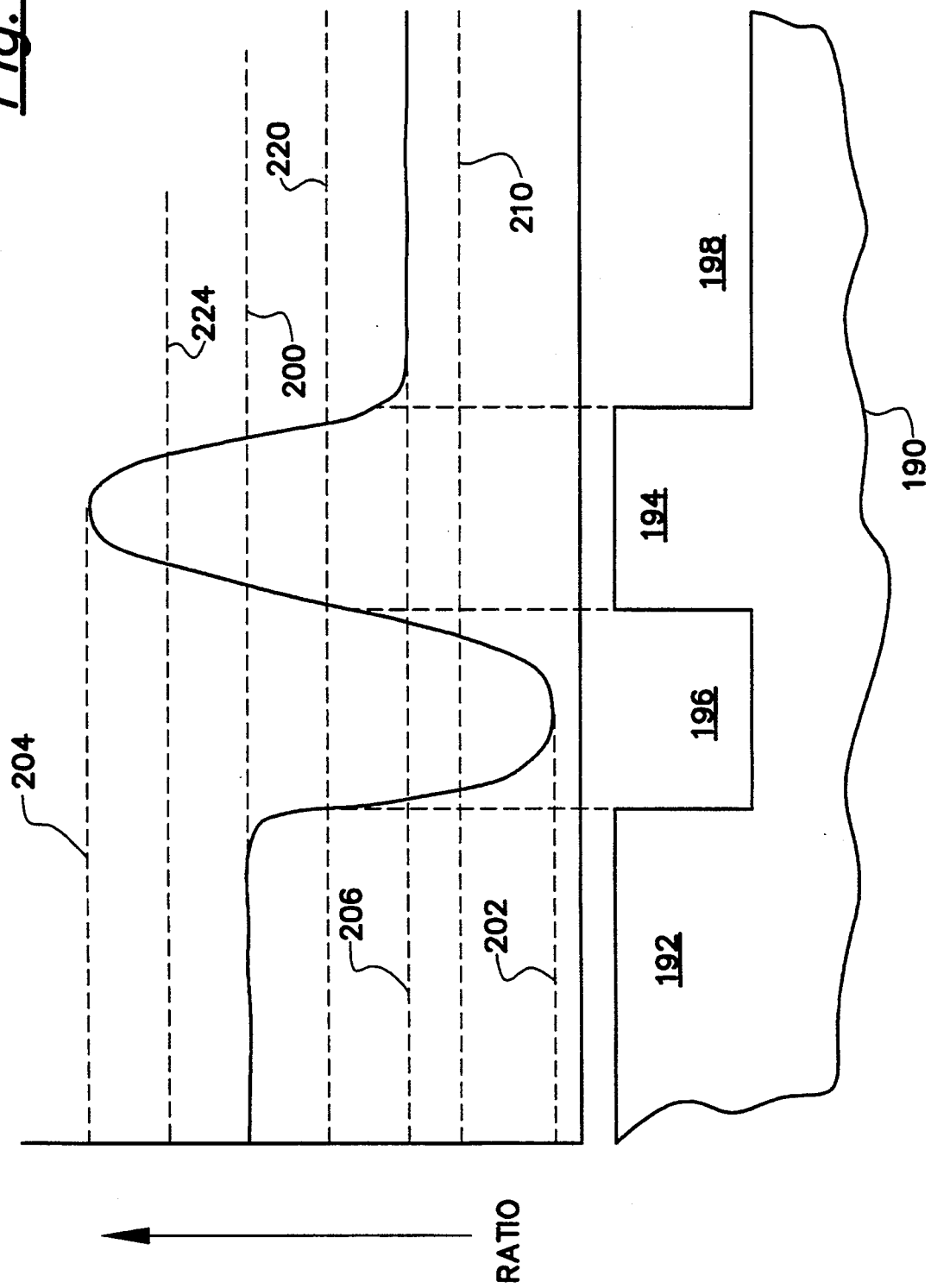

ASYMMETRICAL MAGNETIC POSITION DETECTOR

BACKGROUND OF THE INVENTION

1. Field of the Invention

The present invention relates generally to magnetic sensors in which magnetically sensitive devices are arranged in asymmetric relationship with respect to a magnet and, more particularly, to a gear tooth sensor in which a pair of Hall effect devices are disposed in a common plane which is displaced by a predetermined distance from a central axis of a magnet.

2. Description of the Prior Art

Although magnetically sensitive devices have been used for many years to determine the position of an object, the use of this type of device has increased significantly in recent years because of its use in automotive applications. For example, magnetically sensitive devices are used in both gear tooth sensors and vane switches which are used to control the operation of an internal combustion engine.

U.S. Pat. No. 4,875,008, which issued to Lorenzen on Oct. 17, 1989, describes an angular position sensor for use in association with a rotatable shaft. The sensor utilizes a flat on the shaft and a permanent magnet with its polar axis disposed perpendicularly to the shaft axis. A magneto-resistive element is disposed between the magnet and the flat portion of the shaft. The resistance of the element varies linearly as the shaft is rotated from a first position to a second position.

U.S. Pat. No. 4,853,632, which issued to Nagano et al on Aug. 1, 1989, describes an apparatus for magnetically detecting the position of a moveable magnetic body. The apparatus, which is applicable for sensing the movement of discontinuities in a moveable body, comprises a three terminal magnetic field intensity sensing structure formed by a pair of magneto-resistors. The structure is disposed opposite to a magnetic body which is arranged for movement relative to the structure in a magnetic field. The apparatus generates a first electrical signal of sinusoidal waveform in response to a change in the intensity of the magnetic field due to the relative movement of the magnetic body.

U.S. Pat. No. 4,783,627, which issued to Pagel et al on Nov. 8, 1988, discloses an apparatus for detecting the rotational position of the crank shaft of an internal combustion engine. The apparatus describes a rotor arrangement for use with an automotive Hall generator for detecting the precise position of a select or predetermined one of a plurality of pistons or the precise rotational position of the crank shaft. It provides a distinct marking on a trigger wheel preferable mounted for rotation with the drive shaft of a distributor for generating a signal in a Hall element which is then detected by evaluation circuitry.

U.S. Pat. No. 4,745,363, which issued to Carr et al on May 17, 1988, describes a non-oriented direct coupled gear tooth sensor which uses a Hall cell. It is used to sense gear teeth or similarly shaped discontinuities of a ferrous magnetic or magnetic target. It utilizes a single magnet in association with a direct coupled Hall cell integrated circuit for the purpose of detecting the presence or absence of gear teeth. It incorporates techniques for flux steering and flux reversals independent of the orientation of the sensor to the target to overcome the operate or release point of a Hall switch. The use of spaced apart and offset flux concentrators provides a sensitive device with favorable tolerances in temperature and air gap.

U.S. Pat. No. 4,725,776, which issued to Onodera et al on Feb. 16, 1988, discloses a magnetic position detector which uses a thin film magneto resistor element inclined relative to a moveable object. It employs magneto-resistive elements and detects magnetic teeth of an object to be detected. A constant DC magnetic field is supplied to the magneto-resistive elements in such a way so as to avoid a non-linear region of the DC magnetic field to permit the use of such elements in the region exhibiting good linearity. The present invention provides the DC magnetic field to the magneto-resistive elements by employing a simple structure wherein the magneto-resistive elements are arranged inclined relative to the magnetic field defined between a permanent magnet and the magnetic teeth.

U.S. Pat. No. 4,712,064, which issued to Eckardt et al on Dec. 8, 1987, describes a magneto-resistive sensor for detecting the position or speed of a ferromagnetic body. The sensor is used to emit electric signals in dependency on the position or the speed of a ferromagnetic body. The sensor includes magneto-resistive measuring strips on a substrate which are exposed to a stationary magnetic field such that a large field component extends perpendicular to the measuring strips and a substantially smaller field component in the plane of the measuring strips and at a angle of about 45 degrees to the direction of a measuring current flowing through the measuring strips.

U.S. Pat. No. 4,481,469, which issued to Hauler et al on Nov. 6, 1984, describes a rotary speed sensor with a Hall generator that responds to the tangential component of the magnetic field. In order to determine the rotary speed of a toothed element, such as a starter gear of an internal combustion engine, a magnetic field is generated by a permanent magnet which has both radial and tangential components with respect to the teeth of the rotary element. A magnetic field dependent sensor, such as a Hall generator, is positioned to respond to the tangential component of the magnetic field to thereby eliminate shifts in the null or centerline about which the field strength undulates and the disc rotates to permit ready evaluation of the output from the sensor by threshold circuitry.

U.S. Pat. No. 4,992,731, which issued to Lorenzen on Feb. 12, 1991, discloses a rotary speed sensor that provides base line compensation of the Hall cell output signal. The rotary speed sensor system uses a permanent magnet and a Hall cell sensitive to the changing tangential component of magnetic field caused by the interrupted surface profile of a rotary element. In order to avoid anomalies caused by the variation of the base value of the tangential component of magnetic field, the output of the differential amplifier fed by the Hall cell is connected to a voltage averaging circuit which stores the average voltage of the output on a single compactor. The output of the differential amplifier and the voltage across the capacitor are respectively coupled to the differential inputs of a Schmitt trigger exhibiting hysteresis. The Schmitt trigger thereby establishes operate and release points relative to the average signal. The voltage averaging circuit is a non-linear circuit in which the voltage across the capacitor is fed back to the negative input to an operational amplifier. A power-up circuit is also provided for rapidly charging the capacitor initially to approximately the average value.

It is advantageous for a gear tooth sensing apparatus to be able to distinguish between teeth of different sizes and slots of different sizes so that various coding schemes can be used to determine the accurate position of a rotatable device, such as a crank shaft. In addition, it would be significantly beneficial if the gear tooth sensor is accurately operable on start up without the requirement of rotation of the crank shaft. In other words, a sensor that can determine its position relative to either a tooth or a slot without the need for the rotatable member to rotate is significantly advantageous to an alternative sensor that requires such a rotation prior to its being able to provide the necessary information to control the engine.

SUMMARY OF THE INVENTION

The present invention provides a magnetic tooth sensor that is able to distinguish between short teeth and long teeth and between short slots and long slots and is operable on start up without the necessity of rotating the rotatable device in order for the present invention to determine whether it is proximate a tooth or a slot.

A preferred embodiment of the present invention comprises a first magnetically sensitive device and a second magnetically sensitive device disposed in a common plane that is parallel to a central axis of a magnet and displaced apart from the central axis. In a most preferred embodiment of the present invention, the magnetically sensitive devices are Hall effect elements and the axes of maximum sensitivity of the Hall elements are disposed perpendicular to the common plane. The preferred embodiment of the present invention further comprises a magnet which has north and south magnetic poles disposed along a central axis of the magnet with the central axis being generally parallel to the common plane in which the magnetically sensitive devices are disposed. The central axis of the magnet is displaced apart from the common plane of the magnetically sensitive devices by a preselected distance to provide asymmetry of the sensor. The second magnetically sensitive device, or Hall element, is disposed at a location that is farther from the magnet than the first magnetically sensitive device, or Hall element. Since the axes of maximum magnetic sensitivity of the Hall elements are perpendicular to the common plane in which the elements are disposed and, in addition, because the common plane is parallel to the central axis of the magnet, the two magnetically sensitive devices are arranged to respond to the magnetic field strength of the magnet in a tangential direction.

In the description of the preferred embodiment, terminology that is well known to those skilled in the art will be used to describe the geometry and arrangement of the components. In other words, the radial component of the magnetic field is that component, or vector, which is parallel to the central axis of the magnet and generally perpendicular to the path along which the discontinuities of a rotatable member pass. The tangential component, or vector, on the other hand, is that which is generally perpendicular to the central axis of the magnet and tangential to the path along which the discontinuities pass when the rotatable member rotates. It should be clearly understood that the present invention is not limited for use with only rotatable members and can be used with linearly moveable members.

One preferred application of the present invention is in association with a rotatable gear-shaped member that is attached to a shaft. The rotatable member is provided with a plurality of teeth and slots, or discontinuities, in its surface which create detectable effects on a magnetic field provided by the permanent magnet of the present invention.

The present invention will be described in terms of a particularly preferred embodiment which comprises the provision of a means for providing a magnetic field having a north pole and a south pole which are disposed along a first axis. The present invention also provides first and second means for measuring the first and second magnetic field strengths, respectively, in a direction perpendicular to the first axis at first and second positions, respectively. The first position is closer to the magnet than the second position. The present invention further provides a means for determining a ratio of the first and second magnetic field strengths and a means for comparing the ratio to a predetermined value. The present invention takes advantage of the fact that a ratio of the two magnetic field strengths tangential to the rotatable member provides more valuable information than either of the two individual field strengths provided by the first and second magnetically sensitive devices. Another significant advantage of the present invention is that the use of two magnetically sensitive devices and the formulation of a ratio therebetween significantly diminishes the adverse affects that could otherwise be caused by temperature changes. Since the magnetically sensitive devices, such as Hall effect elements, are somewhat temperature dependant in their operational characteristics, changes in the temperature of the ambient surroundings of the sensor could change the output of the magnetically sensitive device and cause errors. Since the present invention utilizes two magnetically sensitive devices, they are likely to be similarly effected by changes in temperature. Since the present invention uses a ratio of the output from the two magnetically sensitive devices, the temperature effects are essentially eliminated.

BRIEF DESCRIPTION OF THE DRAWINGS

The present invention will be more fully understood from a reading of the Description of the Preferred Embodiment in conjunction with the drawings, in which:

FIGS. 9a–9c test results obtained in relation to the embodiment shown in FIG. 7;

FIG. 10 shows an exemplary relationship between the ratio of the present invention and slots and teeth of varying sizes;

DESCRIPTION OF THE PREFERRED EMBODIMENT

Figure 1:
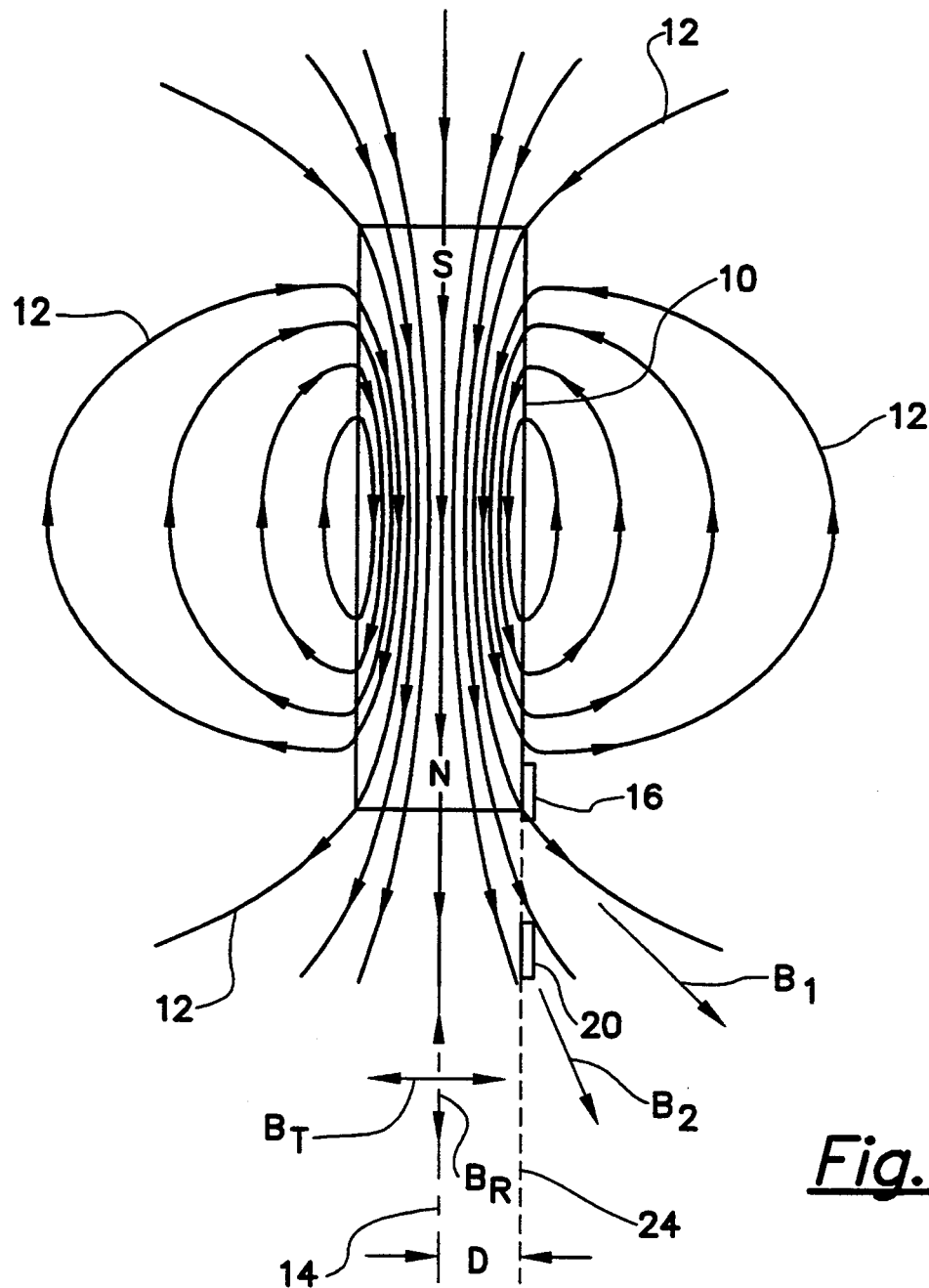
FIG. 1 illustrates the position of the magnetically sensitive devices relative to a magnet according to a preferred embodiment of the present invention.

Throughout the Description of the Preferred Embodiment of the present invention, like components will be identified with like reference numerals.

FIG. 1 illustrates the basic concept utilized by the present invention. A permanent magnet 10 provides a magnetic field which is illustrated by a representative number of flux lines 12. As can be seen in FIG. 1, some of the lines of flux are shown completing a path between the north pole and the south pole of the magnet 10 whereas, for purposes of simplicity and clarity, other lines of flux are shown extending from the north pole of the magnet and others are shown extending toward the south pole of the magnet without their interconnections being shown. It should be understood, however, that all of the flux lines of magnet 10 complete the magnetic circuit between north and south poles even though they are not illustrated as such in FIG. 1. For purposes of this discussion, a central axis 14 of the magnet 10 is illustrated to provide a reference to describe the geometry of the present invention. The north and south poles of the magnet 10 are disposed along the central axis 14. Although the magnet 10 will be described in terms of its central axis 14, it should be clearly understood that the present invention is not limited to the use of a magnet with a particularly shaped cross section. The cross section of the magnet 10 can, for example, be either a rectangle or a circle. The use of the term central axis in the description of the present invention is intended to describe a line along which both the north and south poles are aligned.

Two magnetically sensitive components, 16 and 20, are also illustrated in FIG. 1. The first magnetically sensitive device 16 is disposed at a position which is closer to the magnet 10 than the second magnetically sensitive device 20. In addition, both the first and second magnetically sensitive devices are disposed on a common plane that is generally parallel to the central axis 14. For purposes of this description, the common plane is identified by reference numeral 24 and illustrated as a dashed line in FIG. 1. The common plane 24 is displaced apart from the central axis 14 by a distance D. Although the distance D in FIG. 1 is generally equivalent to half of the thickness of magnet 10, it should be clearly understood that this relationship between the size of the magnet 10 and the magnitude of distance D is not a requirement of the present invention.

With continued reference to FIG. 1, it can be seen that the two magnetically sensitive devices, 16 and 20, are not identically affected by the magnetic field. This is due to the different positions occupied by the first and second magnetically sensitive devices. Because of the shape of the magnetic field of magnet 10 and the relative positions of the lines of flux 12, the resultant vector $B_1$ imposed on the first magnetically sensitive device 16 is of a different magnitude and direction than the resultant vector $B_2$ imposed on the second magnetically sensitive device 20. It should be understood that these resultant vectors, $B_1$ and $B_2$, are the cumulative sums of the entire magnetic fields imposed on the magnetically sensitive devices, 16 and 20. The closer proximity of the first magnetically sensitive device 16 to the magnet 10 is the reason why the overall magnitude of vector $B_1$ is greater than vector $B_2$ and the positions of the lines of flux are the reasons why the directions of the vectors are different from each other. The present invention takes advantage of these distinctions to accurately determine the position of discontinuities relative to the sensor.

The directions of the tangential and radial magnetic fields are also illustrated in FIG. 1. The horizontal arrow $B_T$ represents the direction of the tangential field and the vertical arrow $B_R$ represents the direction of the radial field. As can be seen in FIG. 1, the direction of the tangential field $B_T$ is perpendicular to the common plane 24 and is parallel to the direction of maximum magnetic sensitivity of the magnetically sensitive devices, 16 and 20, which are Hall effect elements in a most preferred embodiment of the present invention. Therefore, the placement of the Hall elements in the present invention, as illustrated in FIG. 1, is such that they are both sensitive to changes in the tangential field $B_T$, but to different degrees.

Figure 2:
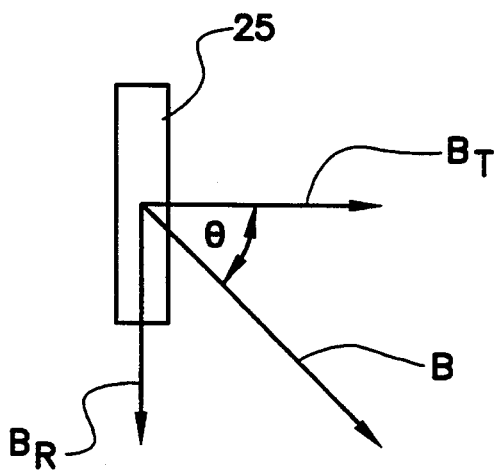
FIG. 2 shows the geometric relationship between the tangential and radial vectors of a magnetic field in relation to a Hall effect element.

In FIG. 2, a representative Hall effect element 25 is illustrated for purposes of further describing the operation of the present invention. It should be understood that the element 25 is representative of either of the two magnetically sensitive devices, 16 and 20 as shown in FIG. 1 and described above. A resultant magnetic field vector B is shown in Figure along with the tangential component vector $B_T$ and the radial component vector $B_R$. Because of the natural operation of magnetically sensitive devices, such as Hall effect elements, which is well known to those skilled in the art, the magnetically sensitive device responds to the tangential component $B_T$ that is perpendicular to it. In other words, the output signal of a Hall effect element exposed to a magnetic field along resultant vector B will respond with an output signal that is directly proportional to the tangential component vector $B_T$. The magnitude of the tangential vector $B_T$ is directly proportional to the product of the resultant vector B and the cosine of the angle $\theta$. With reference to both FIGS. 1 and 2, it can be seen that, for most situations, the magnitude of the resultant vector is greater with respect to the first magnetically sensitive device 16 than it is to the 20 and, furthermore, the magnitude of angle $\theta$ is less for the first magnetically sensitive device than the second. Both of these distinctions tend to cause a higher perpendicular component of the magnetic field in the first magnetically sensitive device than in the second.

Figure 3:
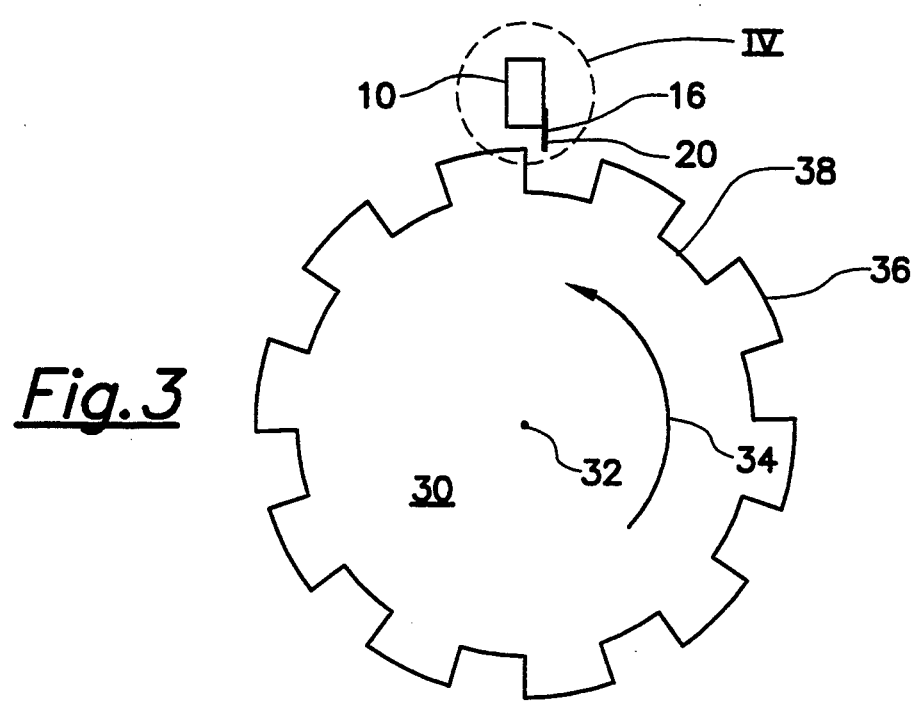
FIG. 3 shows the present invention arranged in association with a rotatable member.
Figure 4:
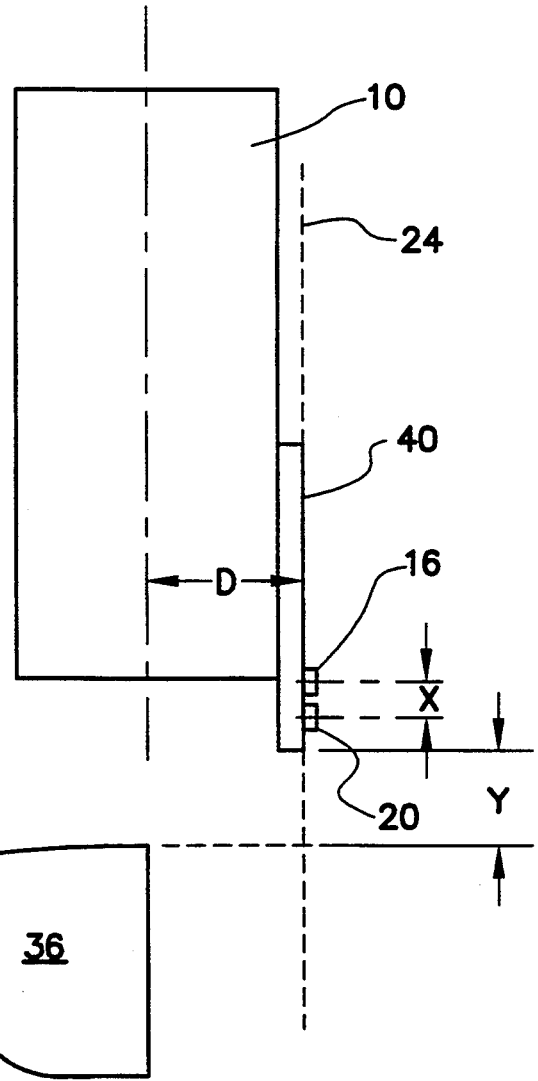
FIG. 4 is an enlarged view of a portion of FIG. 3.

FIG. 3 shows a typical application of a sensor made in accordance with the principles of the present invention. A rotatable member 30 is arranged to rotate about an axis of rotation 32 in a direction represented by arrow 34. The outer surface of the rotatable member 30 is provided with a plurality of discontinuities which, in FIG. 3, are represented by pluralities of teeth 36 and slots 38. The sensor of the present invention is shown with the first and second magnetically sensitive devices disposed proximate a magnet 10 and in a common plane which is spaced apart from the central axis of magnet 10. FIG. 4 shows an enlarged view of the sensor within the dashed circle of FIG. 3.

With continued reference to both FIGS. 3 and 4, it can be seen that the common plane 24 in which the magnetically sensitive devices are placed is generally perpendicular to the path along which the teeth 36 pass as a result of rotation of the rotatable member 30 about the axis 32. The first and second magnetically sensitive devices, 16 and 21, are spaced apart by a distance X in order to dispose the first device 16 at a position closer to the magnet 10 than the second device 20. In a preferred embodiment of the present invention, both of the Hall effect elements are disposed on a substrate 40. Dimension Y represents the gap between the lower edge of the substrate 40 and the magnetic object whose position is to be determined. It is advantageous to position the second magnetically sensitive device 20 as close as possible to the discontinuities of the rotatable member.

Figure 5:
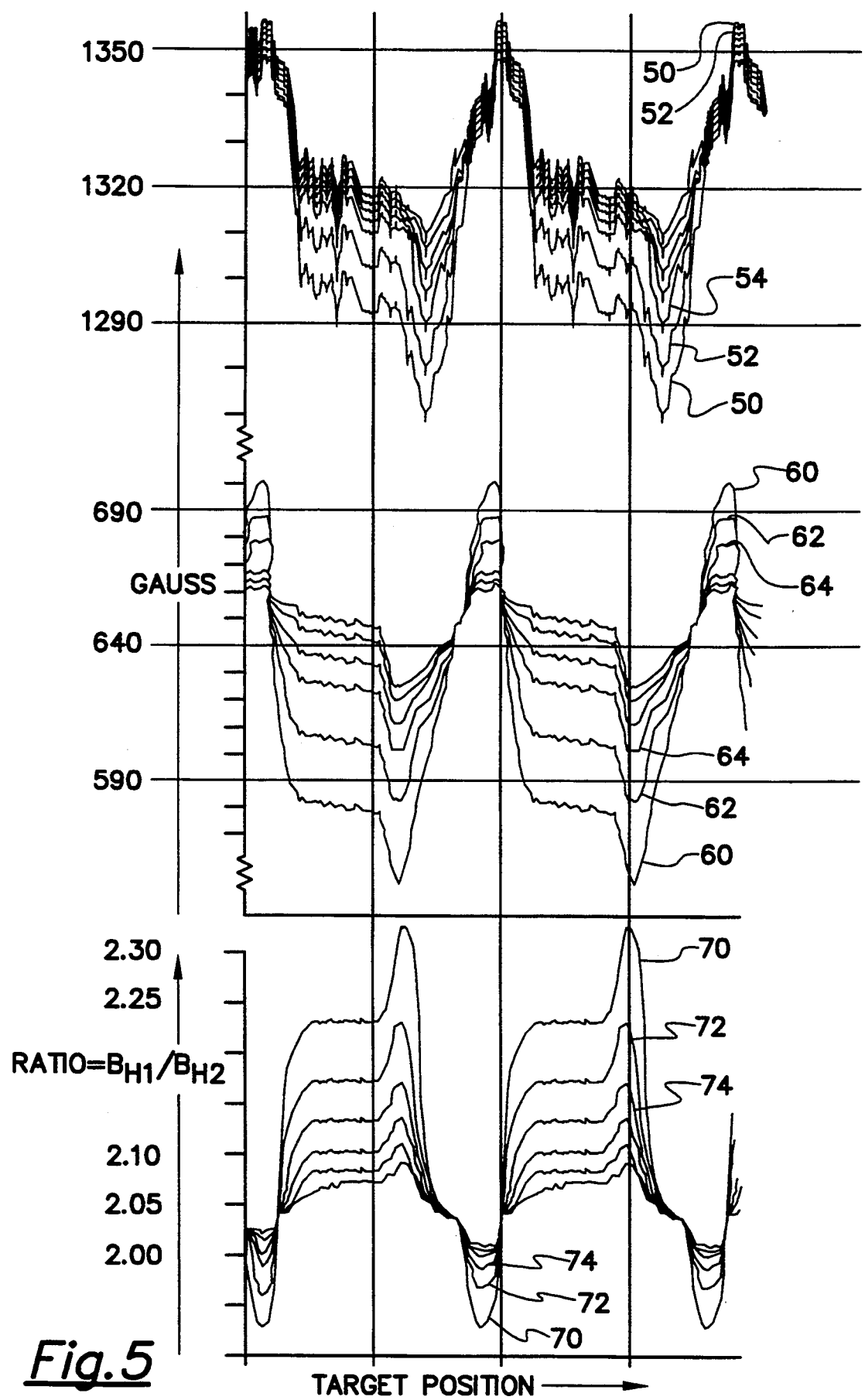
FIG. 5 shows the data from a plurality of tests run with one embodiment of the present invention.

FIG. 5 illustrates the results of empirical tests run for an arrangement generally similar to that shown in FIG. 3. Tests were run for different magnitudes of gap Y in FIG. 4 in association with a magnitude of distance X of 0.050 inches. The upper set of curves in FIG. 5 represent the magnitude of the magnetic field imposed on the first magnetically sensitive device 16 at the different magnitudes of dimension Y. More specifically, curve 50 represents a magnitude of 0.00 inches for dimension Y. It should be understood that, although the gap was intended to be set at zero, some very slight magnitude of gap was necessary to prevent collision between the substrate 40 and the teeth 36. Successive tests were run for dimension Y at magnitudes of 0.020 inches, 0.040 inches, 0.060 inches, 0.080 inches and 0.100 inches. These six tests are represented by the lines shown in the upper portion of FIG. 5. The results at a magnitude of 0.00 inches for dimension Y are represented by curve 50, the results for a magnitude of 0.020 inches are represented by curve 52, the results for a magnitude of 0.040 inches are represented by curve 54, and so on. The use of these six different magnitudes for dimension Y is merely for the purpose of illustrating that the distance between the lower edge of substrate 40 and the tooth 36 changes the values of magnetic field imposed on the device.

The middle set of curves in FIG. 5, partially identified by reference numerals 60, 62 and 64, similarly represent the magnetic field strength perpendicular to the second magnetically sensitive device 20 for magnitudes of 0.00 inches, 0.020 inches and 0.040 inches of dimension Y in FIG. 4. The other three curves shown in the middle portion of FIG. 5 represent tests run with dimensions of 0.060 inches, 0.080 inches and 0.100 inches, respectively, for dimension Y. The purpose of providing the empirical data resulting from these tests, as shown in FIG. 5, is to illustrate the fact that the distance between the magnetically sensitive devices and the path of the discontinuities is important and has an effect of changing the degree to which the magnetic field strengths change as a function of target position. In other words, the changes in magnitude of curve 50 and curve 60 as a function of the position of the target are much greater than the changes in magnitude of their associated curves.

The lower set of curves in FIG. 5 represent the ratio of values of the outputs from the first and second magnetically sensitive devices. In other words, the upper set of curves in FIG. 5 represent the magnetic field strength perpendicular to the first magnetically sensitive device 16, the middle set of curves in FIG. 5 represent the magnitude of magnetic field strength perpendicular to the second magnetically sensitive device 20 and the lower set of curves in FIG. 5 represent the ratio between the two for six different values of Y. As is well known to those skilled in the art, it is generally a desirable characteristic for sensors to be able to operate over a range of gaps so that the installation of the sensor is facilitated.

With continued reference to FIG. 5, and with particular reference to the lower set of six curves in FIG. 5, curve 70 represents the ratio of magnetic fields perpendicular to the first and second magnetically sensitive devices measured with a magnitude of 0.00 inches for dimension Y. Curves 72 and 74 represent ratios for similar tests run for magnitudes of 0.020 inches and 0.040 inches, and so on. While it is difficult to achieve a zero magnitude gap for dimension Y, the curves in FIG. 5 illustrate the desirability of achieving a minimum gap so that the changes in magnitude of the ratio are as large as possible for the purposes of discerning the difference between a gap and a tooth and, as will be discussed below, the differences between short teeth and long teeth and between short gaps and long gaps. It should also be understood that the magnitudes, in gauss, represented in FIG. 5 are the results of one particular set of empirical tests that were run to determine the characteristics of the present invention. Those magnitudes should not be considered to be limiting in any way to the scope of the present invention. In addition, the dashed vertical lines illustrated in FIG. 5 are for the purposes of aligning the upper, middle and lower set of curves visually and do not represent any particular locations of teeth or gaps.

Figure 6:
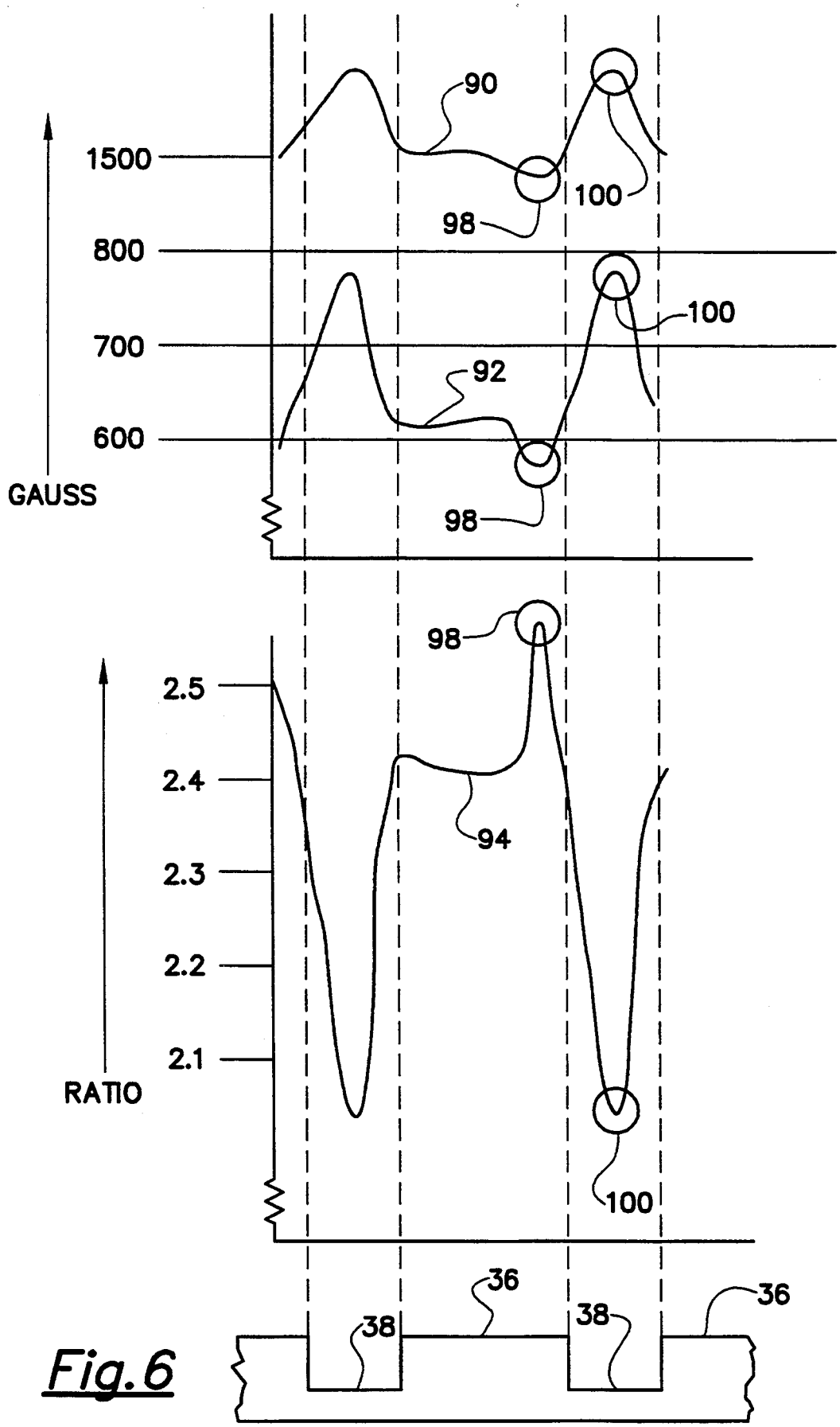
FIG. 6 shows the variations in field strength for two magnetically sensitive devices and the resulting ratio between the two in relation to a particular magnetic target.

While FIG. 5 shows six individual tests and six curves for each of the parameters represented in the figure, for the purposes of illustrating the range of configurations possible within the scope of the present invention, FIG. 6 illustrates the results of computer simulations with a particular gap Y between the lower edge of the substrate and the teeth of a rotatable member. At the bottom portion of FIG. 6, a plurality of discontinuities, such as the teeth 36 and the gaps 38 are illustrated along an exemplary linear axis for purposes of associating of the teeth and gaps to the results of the data represented in the upper and central portions of FIG. 6. The vertical dashed lines at the edges of the teeth and slots are for the purpose of aligning the various sets of curves in FIG. 6. The upper curve 90 represents the magnetic field strength, in gauss, perpendicular to the first magnetically sensitive device 16 as a function of the relative position between the first magnetically sensitive device 16 and the series of discontinuities represented by the teeth 36 and slots 38. Curve 92 represents the magnetic field strength perpendicular to the second magnetically sensitive device 20 plotted as a function of the relative position between the second magnetically sensitive device and the series of discontinuities. Curve 94 represents the ratio between curve 90 and curve 92 for all positions along the horizontal axes. For example, using the data identified by circles 98, curve 90 represents a value of approximately 1,490 gauss and curve 92 represents a magnitude of approximately 580 gauss. This results in a ratio of approximately 2.569 for curve 94. Similarly, the values represented by circles 100 illustrate that when curve 90 has a magnitude of approximately 1.595 gauss and curve 92 has a value of approximately 775 gauss, curve represents a ratio of approximately 2.058.

As can be seen in FIG. 6, although curves 90 and 92 are generally similar in shape they differ in their magnitude and rate of change of magnetic field strength as a function of the relative position between the sensor and the discontinuities by a sufficiently different amount to create a substantial change in the ratio of curve 90 to curve 92 for teeth 36 compared to slots 38. This substantial change in ratio allows the present invention to distinguish between teeth and slots with a higher degree of reliability than previous systems.

Figure 7:
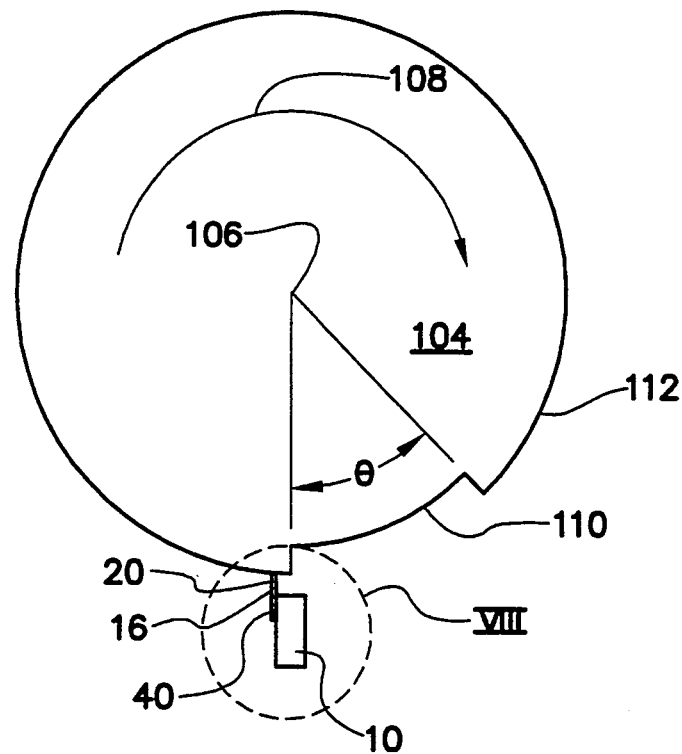
FIG. 7 shows a rotatable member associated with the present invention.
Figure 8:
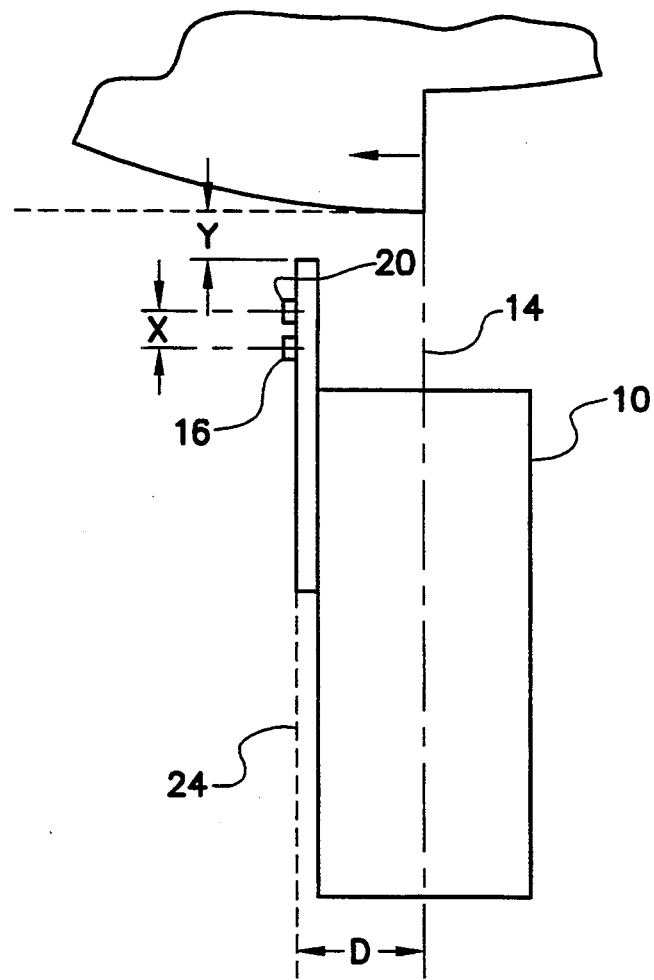
FIG. 8 shows an enlarged view of a portion of the illustration of FIG. 7.

FIG. 7 shows a rotatable member 104 configured to rotate about an axis of rotation 106 in the direction represented by arrow 108. The outer surface of the rotatable member 104 comprises a depression 110 formed in it. The portion of the outer surface that is not indented is identified by reference numeral 112. In effect, the outer surface of the rotatable member 104 represents a single long tooth 112 and a single long slot 110. Shown in FIG. 7, disposed proximate the outer surface of the rotatable 104, is a sensor made in accordance with the concepts of the present invention. As described in greater detail above, it comprises a magnet 10, a substrate 40 and first and second magnetically sensitive devices, 16 and 20. The sensor, which is shown in the dashed circle of FIG. 7, is shown in an enlarged view in FIG. 8. The central axis 14 of magnet 10 is displaced apart from the common plane 24 in which the first and second, 16 and 20, magnetically sensitive devices are disposed. The distance between the common plane 24 and central axis 14 is identified as D in FIG. 8. The long tooth 112 is shown in the position prior to its passage past the first and second magnetically sensitive devices.

Figure 9A:
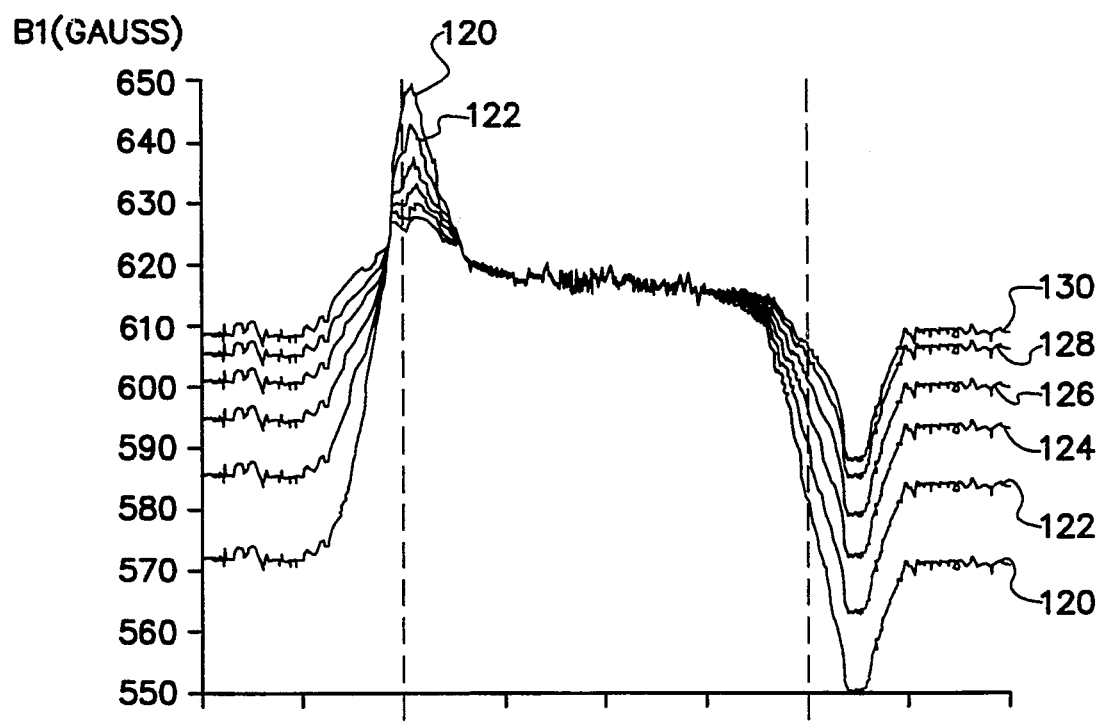
Figure 9B:
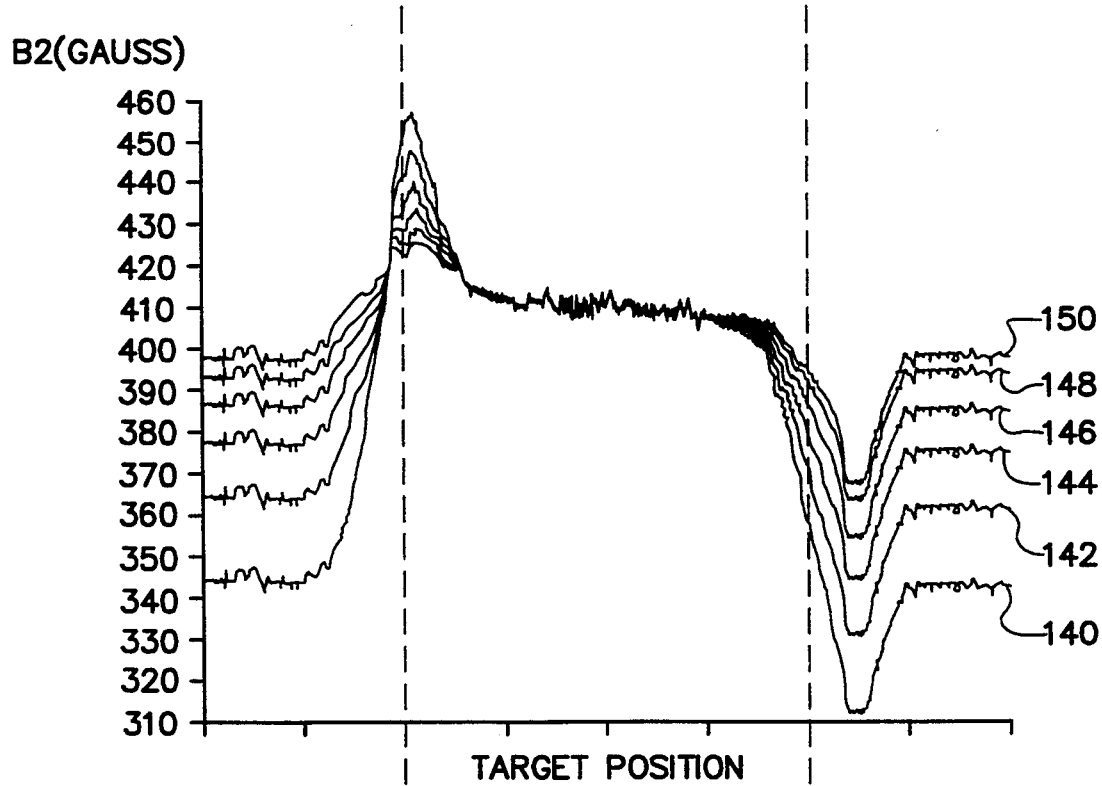

FIG. 9 illustrates the changing magnitudes of magnetic field strength imposed perpendicular to the first and second magnetically sensitive devices, 16 and 20, along with the ratio of the two field strength magnitudes. The curves shown in the upper portion of FIG. 9 represent the magnetic field strength imposed on the first magnetically sensitive device 16 for tests run with a magnitude for dimension Y in FIG. 8 of 0.000 inches, 0.020 inches, 0.040 inches, 0.060 inches, 0.080 inches and 0.100 inches as represented by reference numerals 120, 122, 124, 126, 128 and 130, respectively. These curves show the relationship between the magnetic field strength perpendicular to the first magnetically sensitive device 16, identified as B1, in gauss. The middle illustration in FIG. 9 shows a similar representation for the second magnetically sensitive device 20, identified as B2 in FIG. 9, with the same magnitudes for dimension Y represented by curves 140, 142, 144, 146, 148 and 150, respectively.

The bottom set of curves in FIG. 9 represent the ratios of the magnitudes shown in the upper two sets of curves. The six curves in the bottom portion of FIG. 9 are the result of taking successive tests at the same magnitudes of dimension Y described above, with curve 170 representing the results for a magnitude of 0.000 inches and curve 180 representing the results for the test run for a magnitude of dimension Y of 0.100 inches. As can be seen from the curves in FIG. 9, the present invention provides a measurement that changes significantly as a function of the type of discontinuity proximate the sensor. The significant and predictable change in ratio between the magnetic field strength imposed perpendicularly on the first magnetically sensitive device in relation to that imposed on the second magnetically sensitive device permits related circuitry to accurately determine the presence of a slot or a tooth and, as shown above, to also distinguish between short teeth and long teeth and between short slots and long slots. Furthermore, the ratio between teeth and slots retains good separation as a function of the distance between the sensor of the present invention and discontinuity.

FIG. 10 is a schematic illustration of the relationship between the ratio described above, between the respective magnetic fields on the first and second magnetically sensitive devices, and an exemplary structure 190 comprising short and long slots and teeth. The exemplary structure 190 is shown with a long tooth 192, a short tooth 194, a short slot 196, and a long slot 198. The vertical dashed lines show the spatial relationship between the edges of the teeth and slots and the magnitudes of the ratio for those positions. When the sensor is proximate a long tooth 192, the ratio attains a generally stable magnitude that is represented by dashed line 200. When the sensor approaches and passes over a short slot 196, the magnitude of the ratio drops significantly to the value identified by dashed line 202. As the sensor passes over the short tooth 194, the ratio increases significantly to that represented by dashed line 204. When the sensor of the present invention passes over the long slot 198, the value drops to that identified by dashed line 206. For purposes of illustrating these ratio magnitudes in perspective, dashed line 210 represents the ratio that would be determined if the sensor was placed in air without any magnetic material proximate the first and second magnetically sensitive devices.

The effects on the ratio shown in FIG. 10 result from the magnetic field being distorted by the positions of the teeth and slots. For example the presence of the short tooth 194 severely distorts the field toward general alignment with the central axis of the magnet and significantly increases the ratio between the tangential fields imposed on the two magnetically sensitive devices. A long tooth 192 has a generally similar, but less extreme, effect on the ratio of tangential magnetic fields. When a long slot 198 is proximate the sensor, the bottom of the slot has a much reduced effect on the magnetic field which is only slightly greater than if the sensor is positioned in air with no magnetic material nearby. When a short slot 196 is proximate the sensor, the field is attracted to the teeth on both sides of the slot and actually reduce the ratio to a value less than that when the sensor is not proximate any magnetic material at all. These results are shown in FIG. 10 and illustrate the ability of the present invention to detect teeth and slots of different sizes.

Figure 11C:
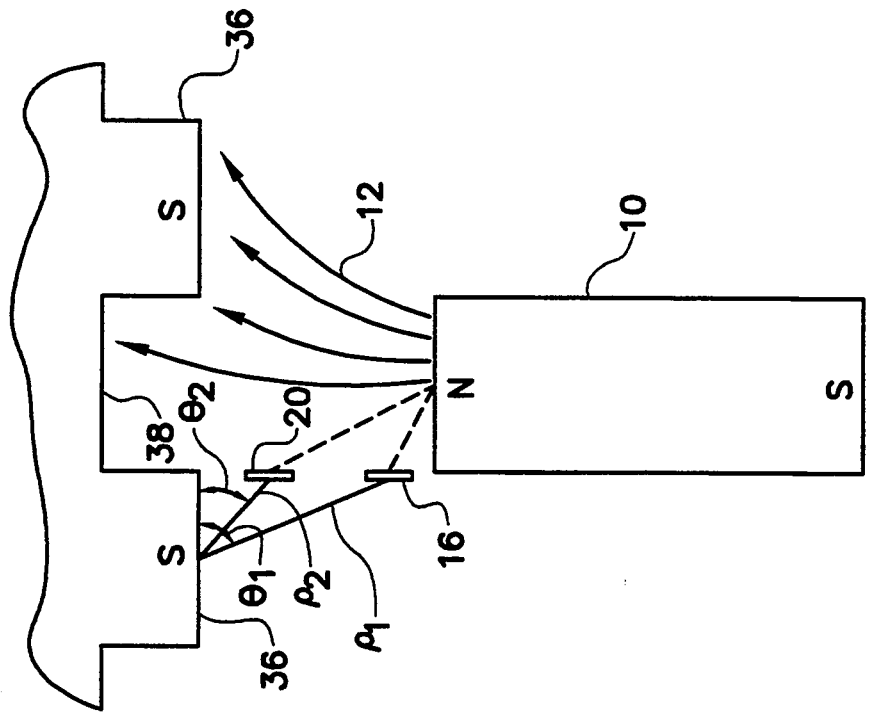
FIG. 11A, 11B and 11C show the different effects caused by teeth and slots.
Figure 11B:
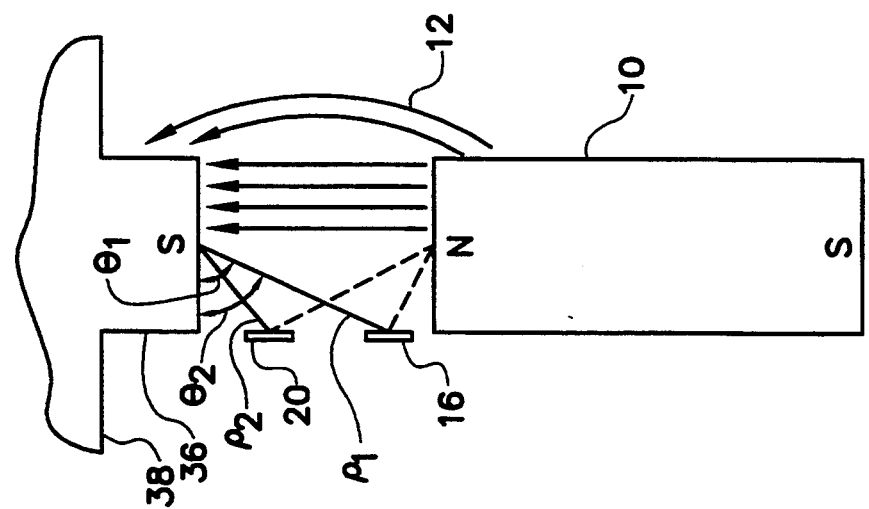
Figure 11A:
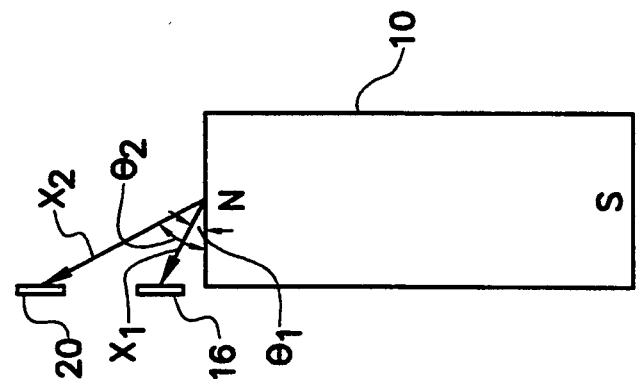

FIGS. 11A, 11b and 11C illustrate the operation of the present invention and the relationship between the direction of the lines of magnetic flux and the effect on the magnetically sensitive devices, 16 and 20. With specific reference to FIG. 11A, the magnet 10 is shown in relation to the two magnetically sensitive devices. Two vectors, with distances $r_1$ and $r_2$, are shown extending from an exemplary point on the north pole of the magnet to the magnetically sensitive devices. From that exemplary point on the magnet 10, vector $r_1$ extends at an angle identified as $\theta_1$ while vector $r_2$ extends at an angle identified as $\theta_2$. To determine the total effect of the magnet on the first magnetically sensitive device 16, the total result of all vectors extending from all points on the face of the magnet 10 must be integrated as shown in equation 1 below.

$$B_{X01} = \int_{AREA} (1/r_1^2) \cdot \cos\theta_1 \cdot (\text{pole strength}) \, dA \qquad (1)$$

Where $B_{X01}$ represents the total magnetic field strength imposed perpendicular to the first magnetically sensitive device when the magnet and magnetically sensitive device are in air with no magnetic object near by. Equation 2, below, represents the same calculation for the second magnetically sensitive device 20.

$$B_{X02} = \int_{AREA} (1/r_2^2) \cdot \cos\theta_2 \cdot \text{(pole strength)} \, dA \quad (2)$$

With reference to equations 1 and 2, it can be seen that for all cases, $r_1$ is less than $r_2$ and, in addition, $\theta_1$ is less than $\theta_2$. Therefore, $B_{X01}$ is always greater than $B_{X02}$ and the ratio of the two values is always greater than 1.0 when the present invention is placed in air with no magnetic material in the vicinity.

When the present invention is disposed proximate a tooth 36 as illustrated in FIG. 11B, the lines of flux are distorted as can be seen by comparing FIG. 11B with FIG. 1. The flux lines extending directly upward from the north pole of magnet 10 in FIG. 11B are straighter than they would be if the magnet was disposed in air. This is the result of the tooth 36 being induced as a south pole because of the proximity of the magnet's north pole. In FIG. 11B, vectors are drawn between an exemplary point on the face of the tooth 36 to each of the magnetically sensitive devices, 16 and 20. The vector extending from the exemplary point to the first magnetically sensitive device is identified as $\eta_1$ and the vector extending from that same exemplary point to the second magnetically sensitive device 20 is identified as $\eta_2$. The angles of these vectors are identified as $\theta_1$ and $\theta_2$, respectively. When the magnet and magnetically sensitive devices are aligned with a tooth 36, as shown in FIG. 11B, the effective magnetic fields imposed perpendicularly to the first and second magnetically sensitive devices, respectively, are described in equations 3 and 4, where $B_{X01}$ is the field impressed on the first magnetically sensitive device by the magnet and $B_{XT1}$ is the field impressed on the first magnetically sensitive device from the induced poles on the tooth surface. Similarly, equation 4 uses this same terminology to describe the combined effect on the second magnetically sensitive device.

$$B_{X1} = B_{X01} + B_{XT1} \quad (3)$$
$$B_{X2} = B_{X02} + B_{XT2} \quad (4)$$
$$B_{XT1} = \int_{TARGET\ AREA} (1/\rho_1^2) \cdot \cos\theta_1 \cdot \text{(induced pole strength)} \, dA \quad (5)$$

$$B_{XT2} = \int_{TARGET\ AREA} (1/\rho_2^2) \cdot \cos\theta_2 \cdot \text{(induced pole strength)} \, dA \quad (6)$$

Equations 5 and 6 describe the total effect of the induced pole, or tooth, on the magnetic field imposed on each magnetically sensitive device. Because the second magnetically sensitive device 20 is closer to the tooth 36 and has a smaller angle $\theta_2$, it can clearly be seen that $B_{XT2}$ is larger than $B_{XT1}$ and, furthermore, that both of these magnetic effects caused by the tooth are in the negative direction opposing the magnet's field. This relationship can be stated as shown in equation 7.

$$B_{X1}/B_{X2} > B_{X01}/B_{X02} \quad (7)$$

Therefore, the ratio determined by the present invention when a tooth is proximate the sensor is greater than the ratio determined when no tooth is present.

FIG. 11C shows the present invention disposed proximate a slot 38 between two teeth 36. The lines of magnetic flux 12 are shown diverging from a central axis of the magnet toward the teeth. Although in FIGS. 11B and 11C the magnetic lines of flux are only shown at the right portion of the magnet for purposes of clarity and to permit the vector lines to be shown in the figure, it should be understood that the lines of flux in both of these figures are symmetrical about the north and south pole axis. When the lines of flux diverge as shown in FIG. 11C, their effect on each of the magnetically sensitive devices, 16 and 20, is changed. The induced south poles on both of the teeth 36 are closer to the second magnetically sensitive device than the first. However, when the teeth are positioned relative to the sensor as shown in FIG. 11C, the leftmost tooth and the magnet 10 are on the opposite side of the magnetically sensitive devices. This oppositely directed field is schematically represented by vectors $\eta_1$ and $\eta_2$ and their respective angles $\theta_1$ and $\theta_2$ in FIG. 11C. Because of the more significant effect of the induced south pole of tooth 36 on the second magnetically sensitive device 20, the denominator in the ratio of the two magnetically sensitive devices is more severely increased when a slot 38 is proximate the sensor as shown in FIG. 11C. This causes the ratio to decrease relative to the ratio if the sensor is placed in air by a sufficient amount to permit a slot to be detected and identified.

FIGS. 11A, 11B and 11C therefore illustrate the effect on the magnetic flux lines 12 of a magnet 10 when various discontinuities pass by the magnetically sensitive devices of the sensor. FIG. 11B shows how the lines of flux 12 are generally straightened when a short tooth 36 passes the sensor. It should be understood that a long tooth passing by the sensor would have a slightly decreased effect because a long tooth forces the straightened lines of flux to pass along a less confined region than a short tooth. FIG. 11C shows the diverging of the lines of magnetic flux 12 toward the two teeth 36 bordering a slot 38. It can easily be seen that a long slot would have a diminished effect on the ratio, relative to air, than the short slot.

As can be seen in FIG. 10, short and long teeth can be distinguished from each other and short and long slots can be distinguished from each other if appropriate threshold magnitudes are selected for comparison with the resulting ratio. In addition, the difference between a tooth and a slot can be identified even without rotation or movement of the rotatable member with respect to the sensor. For example, if the threshold magnitude identified by dashed line 220 is used, any ratio value exceeding the magnitude of dashed line 220 indicates that the sensor is proximate a tooth whereas a ratio magnitude less than that represented by dashed line 220 indicates that the sensor is proximate a slot. In addition, a short slot 196 can be distinguished from a long slot 198 if the ratio magnitude is less than that represented by dashed line 210. Similarly, a threshold such as that represented by dashed line 224 can be used to distinguish a short tooth 194 from a long tooth 192.

Figure 12:
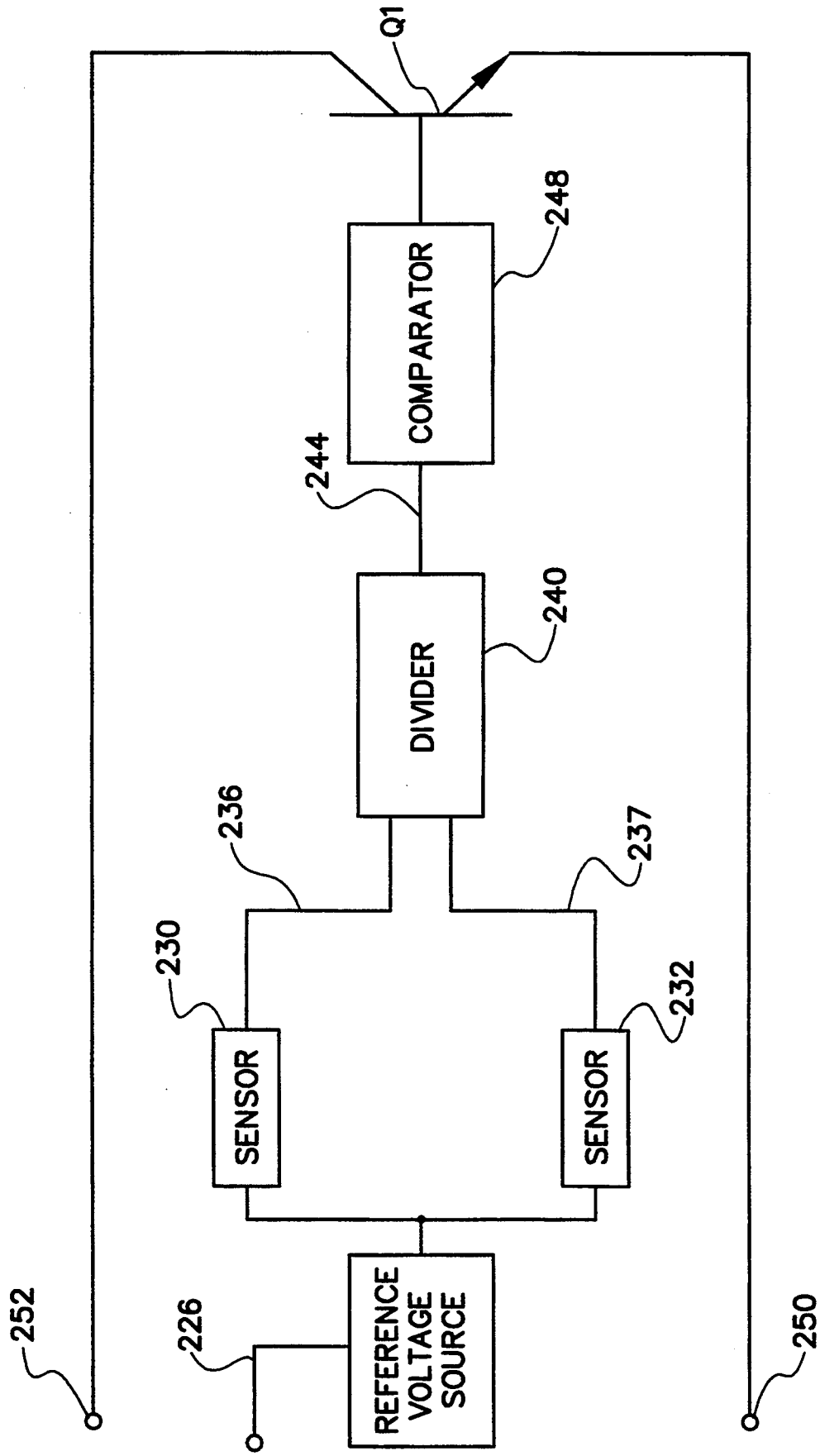
FIG. 12 shows an exemplary schematic diagram of a circuit suitable for use in association with the present invention.

FIG. 12 shows a simplified schematic diagram of a circuit that is suitable for use in association with the magnetically sensitive devices described above. A reference voltage 226 is provided to first and second Hall effect devices, 230 and 232. As is well known to those skilled in the art, Hall effect devices provide an output signal that is directly proportional to the magnitude of the magnetic field imposed perpendicular to the devices. The signal voltage on lines 236 and 237 would therefore be proportional to the magnitude of magnetic field strength that is represented in the curves in the upper and middle illustrations of FIG. 5, the upper and middle illustrations of FIG. 6 and the upper and middle illustrations of FIG. 9. Those voltage signals are provided to a means 240 for forming a ratio of the two signals. In other words, the device identified by reference numeral 240 in FIG. 12 is a means by which the signal on line 236 can be divided by the signal on line 237. The output signal, on line 244, is provided to a means 248 by which the ratio on line 244 can be compared to a reference value. For example, the device identified by reference numeral 248 in FIG. 12 can be a Schmitt trigger. The output from the comparison device 248 is shown connected to the base of transistor Q1 which, in turn, completes a circuit between circuit points 250 and 252 to indicate the ratio on line 244 has exceeded the predetermined threshold value. It should clearly be understood that, as described above, the output on line 244 can be compared to several different threshold values. In applications which compare the ratio on line 244 to more than one threshold value, the circuit would differ slightly from that shown in FIG. 12. However, it should also be recognized that modifications to the circuit of FIG. 12 are within the scope of the present invention and will differ slightly as a function of the particular application of the invention.

Although the present invention has been described in significant detail and illustrated with particular specificity to a particular preferred embodiment of the present invention, it should be understood that other embodiments are within the scope of the present invention.

I claim:

1. A sensor, comprising:
a first magnetically sensitive device;
a second magnetically sensitive device, said first and second magnetically sensitive devices being disposed in a common plane with the axes of maximum sensitivity of said first and second magnetically sensitive devices being perpendicular to said common plane;
a magnet having north and south poles disposed on a central axis of said magnet, said central axis being generally parallel to said common plane and displaced apart from said common plane by a preselected distance, said second magnetically sensitive device being disposed farther from said magnet than said first magnetically sensitive device, said common plane being generally perpendicular to a path of a plurality of discontinuities formed in a surface of a movable object; and
first means for providing a first signal representative of the component of magnetic field perpendicular to said first magnetically sensitive device;
second means for providing a second signal representative of the component of magnetic field perpendicular to said second magnetically sensitive device; and
means for determining a ratio of said first signal and said second signal.

2. The sensor of claim 1, wherein:
said first and second magnetically sensitive devices are Hall effect elements.

3. The sensor of claim 1 wherein:
said moveable object is rotatable about a central axis.

4. The sensor of claim 1 further comprising:
means for comparing said ratio to a predetermined value.

5. A sensor, comprising:
a magnetic having a north pole and a south pole disposed on a central axis of said magnet;
a first Hall effect element and a second Hall effect element disposed on a common plane, said common plane being generally parallel to said central axis and displaced apart from said central axis by a preselected distance;
means for determining a ratio of the strengths of the magnetic fields imposed perpendicularly on said first and second Hall effect elements;
means for comparing said ratio to a predetermined value; and
a plurality of discontinuities formed in a moveable surface of a magnetic member, said common plane being disposed perpendicular to a path along which said plurality of discontinuities are configured to pass, said second Hall effect element being disposed farther from said magnet than said first Hall effect element, said first and second Hall effect elements having axes of maximum sensitivity which are perpendicular to said common plane.

6. The sensor of claim 5, wherein:
said magnetic member is rotatable about an axis of rotation.

7. The sensor of claim 6, wherein:
said common plane is parallel to said axis of rotation.

8. A sensor, comprising:
means for providing a magnetic field having a north pole and a south pole disposed along a first axis;
first means for measuring a first strength of magnetic field perpendicular to said first axis at a first position;
second means for measuring a second strength of magnetic field perpendicular to said first axis at a second position, said first position being closer to said providing means than said second position;
means for determining a ratio of said first and second magnetic field strengths; and
means for comparing said ratio to a predetermined value, said first and second measuring means are disposed in a common plane, said common plane being generally parallel with said first axis, said first and second meassuring means having axes of maximum sensitivity which are perpendicular to said common plane, said common plane being disposed perpendicular to the path along which a target is intended to pass.

9. The sensor of claim 8, wherein:
said first and second measuring means comprise Hall effect elements.

10. The sensor of claim 8, further comprising:
a rotatable member disposed proximate said first and second measuring means, said rotatable member comprising at least one discontinuity in its surface.

11. The sensor of claim 10, wherein:
said common plane is generally parallel to an axis of rotation of said rotatable member.

12. The sensor of claim 8, wherein:
said providing means comprises a permanent magnet.

13. The sensor of claim 12, wherein:
said permanent magnet has a generally rectangular cross section perpendicular to said first axis.

* * * * *